US012038291B2

(12) United States Patent
Hubschneider

(10) Patent No.: US 12,038,291 B2
(45) Date of Patent: Jul. 16, 2024

(54) COMPUTER SYSTEM AND METHOD FOR DETERMINING STAY PERIODS OF A ROAD VEHICLE

(71) Applicant: PTV Logistics GmbH, Karlsruhe (DE)

(72) Inventor: Michael Hubschneider, Karlsruhe (DE)

(73) Assignee: PTV Logistics GmbH, Karlsruhe (DE)

( * ) Notice: Subject to any disclaimer, the term of this patent is extended or adjusted under 35 U.S.C. 154(b) by 0 days.

(21) Appl. No.: 18/046,796

(22) Filed: Oct. 14, 2022

(65) Prior Publication Data

US 2023/0117496 A1 Apr. 20, 2023

(30) Foreign Application Priority Data

Oct. 18, 2021 (EP) ..................... 21203299

(51) Int. Cl.
*G01C 21/34* (2006.01)
*G01C 21/36* (2006.01)
(52) U.S. Cl.
CPC ..... *G01C 21/3461* (2013.01); *G01C 21/3492* (2013.01); *G01C 21/3617* (2013.01)
(58) Field of Classification Search
CPC ............ G01C 21/3461; G01C 21/3492; G01C 21/3617; G01C 21/26; G06Q 10/047;
(Continued)

(56) References Cited

U.S. PATENT DOCUMENTS

2019/0347513 A1* 11/2019 Salti ..................... G06F 18/2431
2021/0312358 A1 10/2021 Okazaki et al.

FOREIGN PATENT DOCUMENTS

CN 107289925 B 3/2021
EP 1106968 A1 6/2001
(Continued)

OTHER PUBLICATIONS

Charge Definition & Meaning—Merriam-Webster.pdf (Charge Definition & Meaning—Merriam-Webster, 2023, https://www.merriam-webster.com/dictionary/charge, pp. 1-9) (Year: 2023).*

(Continued)

*Primary Examiner* — Bao Long T Nguyen
(74) *Attorney, Agent, or Firm* — Brake Hughes Bellermann LLP

(57) ABSTRACT

Described techniques receive location data with associated timestamps from one or more location sensors spatially associated with the vehicle. Each pair of consecutive location data defines a segment of the vehicle's trajectory. The system aggregates potential stay periods of consecutive segments into an aggregated stay interval as long as a predefined segment clustering rule is fulfilled by the consecutive segments. A potential stay of the vehicle with a potential stay period for a respective segment is detected if the time interval associated with the respective segment is longer than an expected driving time needed for driving a distance associated with the respective segment at a predefined expected speed. The potential stay period is computed for the respective segment as the difference between the associated time interval and the expected driving time. The system detects a stay of the vehicle if the aggregated stay interval reaches a predefined minimum stay period.

20 Claims, 7 Drawing Sheets

(58) Field of Classification Search
CPC .. G06Q 10/063; G06Q 50/30; G01S 2205/01; G01S 5/017; G08G 1/0108; G08G 1/0112; G08G 1/0133
See application file for complete search history.

(56) References Cited

FOREIGN PATENT DOCUMENTS

| | | |
|---|---|---|
| EP | 3121562 A1 | 1/2017 |
| WO | 2008051663 A2 | 5/2008 |

OTHER PUBLICATIONS

European Search Report for Application No. 21203299.9, mailed on Apr. 12, 2022, 9 pages.

* cited by examiner

COMPUTER SYSTEM AND METHOD FOR DETERMINING STAY PERIODS OF A ROAD VEHICLE

CROSS-REFERENCE TO RELATED APPLICATIONS

The present application claims priority to EP Patent Application No. 21203299.9, filed on Oct. 18, 2021, and entitled "Computer System and Method for Determining Stay Periods of a Road Vehicle," the disclosure of which is hereby incorporated by reference in its entirety.

TECHNICAL FIELD

The present description generally relates to systems for road vehicle navigation, and in particular to systems and methods for the determination of vehicle motion.

BACKGROUND

Some applications in the context of route planning for vehicles or vehicle navigation, such as for example the calculation of arrival times for transport or delivery vehicles, require accurate information about stay periods of a vehicle. Earlier approaches may require user input about stays, which is notoriously unreliable and subject to errors, oblivion and manipulation. For example, legal provisions may require exact measurement and logging of stay times in a non-modifiable way. Some earlier approaches may automatically perform stay detection based on track points, or location data sets, received from a telematics device or similar means installed in a vehicle. For example, a stay may be detected by identifying a stop of the vehicle when at least two consecutive points are at the same location, and a restart when at least two points differ significantly from the stop location and exhibit an outward trend. However, such approaches rely on a sufficiently short time interval between the track points (location data). The interval between consecutive track points is assumed to be between 30 seconds and 3 minutes. The error of the determined duration of a stay may be as large as two times that interval. In some real-world setups, the interval may be of the order of 10 minutes, allowing for errors of up to 20 minutes. An error this large is unacceptable for many applications, such as the detection of stays associated with breaks. Such long intervals may be due, for example, to the overall setup or the configuration of the transmitting device, or even an artificial reduction of the temporal density because of bandwidth limitations or privacy concerns.

SUMMARY

Hence, there is a need for an improved system and method for a more accurate objective determination of stay periods of a vehicle. This technical problem is solved, or example, by embodiments according to the independent claims.

In one example embodiment, a computer-implemented method for detecting a stay of a vehicle is provided. A computer system for executing the computer-implemented method has an interface component to repeatedly receive location data with associated timestamps from one or more location sensors associated with the vehicle. Many vehicles are equipped with Global Positioning System (GPS) receivers to determine the current physical location of the vehicle. However, any other location sensor appropriate for determining the current location may be used, such as for example, sensors for WLAN signals or mobile communication cell signals where triangulation methods or similar methods can be applied. Besides a GPS sensor, a person skilled in the art may also use a GNSS sensor, a GBAS sensor, or a LAAS sensor as location sensor. The interface component may communicate with the location sensor(s) via an appropriate network, such as for example, a CAN-bus as used in most modern cars. However, the location sensor may also be attached to a mobile navigation device which is placed in the vehicle but not communicatively coupled with the vehicle electronics. In some cases, status data like the engine status or the rotational speed of the wheels cannot be accessed via the interface component. In such cases, the location sensor data can be used for stay detection without any further additional status information about the vehicle status.

Each pair of consecutive location data defines a segment of the vehicle's (real-world) trajectory. Each segment is associated with a time interval (the segment time interval) defined as the difference between the timestamps of the corresponding pair of consecutive location data. Thereby, the location data with the earlier timestamp of such pair represents the start location of the respective segment, and the location data with the later timestamp represents the end location of the respective segment. It is to be noted that the term "segment" as used herein is only defined by such pairs of start location and end location (with respective timestamps) which correspond to respective consecutive location data. Often, in the context of route planning or navigation systems, the term "road segment" is used for specifying a particular road portion on a planned route. To avoid any ambiguity of the term "segment" in the following, this disclosure refers to such "road segments" only as "road portions".

A stay detection module of the computer system then aggregates potential stay periods of consecutive segments into an aggregated stay interval as long as a predefined segment clustering rule is fulfilled by the consecutive segments. A potential stay of the vehicle with a potential stay period for a respective segment is detected if the time interval associated with the respective segment is longer than an expected driving time needed for driving a distance associated with the respective segment at a predefined expected speed. The potential stay period is computed for the respective segment as the difference between the associated time interval and the expected driving time. At this point in time, it is not yet clear if a potential stay period actually belongs to a real-world stay of the vehicle. In case the system later detects that such a stay occurred, a potential stay period is treated as an actual stay period of the respective segment.

In general, the predefined segment clustering rule defines conditions under which
 a segment cluster is initialized,
 segments are appended (added) to an active segment cluster, and
 the active segment cluster is completed (i.e., the final segment has been added to the active segment cluster).

A segment cluster which is completed includes all segments which contribute to the aggregated stay interval associated with a particular stay of the vehicle. In other words, each segment is added to the active segment cluster for which a potential stay period associated with the particular stay location of the vehicle is detected. The aggregated stay interval of the completed segment cluster corresponds to an accurate estimate of the time interval during which the vehicle has not moved. Thereby, segment clustering in accordance with the segment clustering rule ensures that also potential stay periods of the segments in which the vehicle comes to a stop (i.e., arrives at its stay location) and in which the vehicle restarts (i.e., departs from its stay location) are taken into account when computing the aggregated stay interval.

For example, the predefined segment clustering rule is fulfilled by a current segment if either the current segment triggers the initialization of a segment cluster (i.e., flagging the segment cluster as active and adding the current segment to the activated segment cluster as its first segment), or is appended to the active segment cluster. This is the case if one of the following conditions is met:

a) condition for initializing an active segment cluster (if there is no active segment cluster) and adding the first segment:
   the current segment is the first segment for which a potential stay with a potential stay period greater than zero is detected. In this case, the segment cluster is initialized by flagging the segment cluster as active and setting the end location of the current segment as active cluster location. Only when the segment cluster is active (i.e., the respective active cluster location has been set) further segments can be added to the active segment cluster.
OR
b) condition for adding further segments to the active segment cluster:
   the distance between the cluster location of the active segment cluster and the end location of the current segment is smaller than a predefined first distance wherein the first distance is selected to compensate for imprecision of the received location data. In other words, the first distance defines a tolerance value to suppress fluctuations in the location sensor signals. In certain situations, the received sensor location data may be of low precision. For example, the location sensor may receive a GPS signal from only few satellites or may receive noisy or reflected cell tower signals. In this case the received location data may show a relatively high noise level and the received location data may be distributed around the actual stop location (e.g., in a Gaussian distribution). The first distance is selected such that locations different from the active cluster location but within the first distance are not interpreted as movements. The potential stay period for the respective segment corresponds to the entire time interval of said segment. In other words, for all segments between the first segment and the last segment of the active segment cluster, it is assumed that the vehicle is not moving and therefore the time intervals associated with such in-between segments are fully added to the aggregated stay interval.
OR
   the potential stay period of the current segment is greater than zero, wherein the current segment is detected as the last segment to be added to the active segment cluster if the distance between the active cluster location and the end location of the current segment exceeds a predefined second distance. Thereby, the second distance is greater than or equal to the first distance. The system uses this condition to recognize the last segment of the active segment cluster. The second distance is set to a value which is such that if the vehicle drives in the current segment a longer distance than the second distance, it can be clearly concluded that the vehicle has left its stay location. Any later segment, even if associated with a potential stay period greater than zero, does not contribute any more to the aggregated stay interval of the active cluster but would rather trigger a reinitialization of the active cluster with a new active cluster location. Once the last segment of the active segment cluster has been detected, the segment cluster is flagged as inactive again and will be reinitialized once a new "first segment" is detected under condition i) of the predefined clustering rule. The use of the second distance further allows to prevent that creeping movements (i.e., very slow movements of vehicles) are falsely interpreted as a stay.

The size of the first distance may be dynamically adjusted taking into account the quality of the positioning signals received from the one or more location sensors. The size of the second distance may be individually adjusted based on the use case.

The system finally detects a stay of the vehicle if the aggregated stay interval exceeds a predefined minimum stay period. Setting such a predefined minimum stay period as threshold allows to filter out minor accidental stay detections (e.g., short stops at traffic signals or in traffic jams). The minimum stay period can be chosen dependent on the application scenario of stay detection. For example, if any stay is to be detected (e.g., in a traffic jam with stop-and go traffic flow), a low minimum stay period may be used which is smaller than the interval of a segment. In such case, often a segment cluster would include only the first segment. If, however, only longer stays are to be detected (e.g., the vehicle being in a parking position when the driver is taking a break, or loading/unloading goods or performing a service at a customer site), the minimum stay period may be set to a larger value adapted to the typical time scale of the respective scenario. This larger value may be greater than the typical segment time interval and can have a duration corresponding to multiple segment time intervals. The herein disclosed stay detection method is very flexible in that it works equally accurate for location data received at high frequencies up to 1 Hz, and for location data received at low frequencies (e.g., with some segment intervals in the order of 12 hours) which also covers situations with gaps in the location data flow when, for example, a driver has switched off the system entirely during an overnight stay. Once a stay of the vehicle has been detected, the system may store the respective aggregated stay interval. This includes storing the aggregated stay interval in a storage means of the computer system, but also providing the data to a remote storage device (e.g., a server or cloud storage).

The herein disclosed approach can also cope with tracks which are based on reasonably short segment time intervals but which may comprise longer gaps between location data, that may occur for example when the driver switches off the device, or if the device lacks a GNSS signal because the vehicle is standing under a roof or in a building. Such gaps typically occur at or in the vicinity of a stay—precisely where temporally dense tracks (location data) matter most for stay detection. Typically, the previously described prior art solution fails to detect such stays. Similarly, besides a total loss of signal, GNSS conditions at a stay location may result in poor precision of the position measurement or larger fluctuations, which may prevent the correct detection of a stay by the prior art solutions. This is especially true for so-called urban canyons, woods or densely built industrial sites. The herein disclosed segment clustering rules allow the accurate measurement of aggregate stay periods even under such difficult conditions.

The herein disclosed method and system may use different implementations with regard to determining the distance associated with a respective segment. In one implementation, the bee-line distance between start location and end location of the respective segment may be used. In this implementation it is advantageous to use a relatively low predefined expected speed for the respective segment because the bee-line distance is typically shorter than the corresponding road distance actually traveled by the vehicle. Typically, the expected speed value is vehicle specific (e.g., truck, normal car, etc.).

In an alternative implementation, the routing distance (or road distance) between start location and end location of the respective segment is used. The routing distance can be determined by mapping start location and end location of the respective segment to a road network and determining the corresponding routing distance (driving distance) by calculating a route likely traveled by the vehicle. Computing a routing distance in a road network is well known in the art. In this implementation, the predefined expected speed for a segment is determined from historic speed data which is associated with road portions covered by said segment (or, if not available, from a speed value associated with the respective segment type provided by a speed database). That is, this implementation can take into account multiple speed values associated with different road portions of the computed route. In this implementation, the expected speed value can be vehicle specific (e.g., truck, normal car, etc.) and/or road specific (e.g., urban road, interurban road, highway, pass road, etc.). The expected speed value may also be time dependent (time of the day or day of the week) and can be determined based on historic speed data captured for the respective road network where the vehicle is driving.

In the routing distance implementation, it may occur that the start location and/or end location cannot be mapped onto a particular road portion of the road network. For example, this may happen if the vehicle is currently on private premises not included in the respective road network. In this case, a predefined off-road speed value (e.g., 20 km/h or less) can be used for the bee-line distance between the start location and its nearest known road portion of the road network, and/or between the end location and its nearest known segment of the road network. This is a typical routing function of most navigation systems where the routing is completed by such bee-line connections between the current location of the vehicle and the closest road portion of the road network.

Both implementations may use a data source providing the predefined expected speed for the respective segment with a time-dependency reflecting different traffic conditions during the day. For example, the expected speed for a particular segment during rush hours may be significantly lower than during other times of the day. There may also be different speed values for the same time of day on different days. For example, the expected speed at a given time during work days may be lower than at the same time of day during the weekend. The expected speed value which is finally used for the potential stay computation of the segment can be selected based on one of the timestamps associated with the start or end location of respective segment. That is, the system retrieves the time-dependent speed value which matches the respective timestamp.

Once a stay is detected, the system can determine the actual time of arrival for the stay of the vehicle as the timestamp associated with the cluster location minus the potential stay period of the first clustered segment. Similarly, the actual time of departure can be determined as the timestamp of the start location of the last clustered segment plus the potential stay period of the last clustered segment.

In one embodiment, the stay detection system may be communicatively coupled to a vehicle navigation system. The navigation system may include a route planning component to compute an expected arrival time of the vehicle (at one or more destinations) based on a planned route, a start time and at least one planned stay period. For example, a navigation system for trucks may allow the planning of stay periods for the truck because the truck drivers often must take breaks to comply with legal requirements. The navigation system further has an interface component to receive the measured aggregated stay interval from the stay detection system. In many situations, such as for example, just in time delivery of goods for manufacturing, it is important to continuously update the expected arrival time of the vehicle based on the actual driving performance. In such cases, it is advantageous for the navigation system to recognize whether a detected stay period of the vehicle corresponds to a planned stay period (break) or whether the vehicle briefly stopped for some other reason (e.g., because of a traffic jam). For this purpose, the navigation system may use an updating component to update the expected arrival time based on the current location of the vehicle, the current time, and the received aggregated stay interval. Thereby, updating includes charging the aggregated stay interval up against the at least one planned stay period if the length of the aggregated stay interval exceeds a pre-defined threshold. In other words, only if a detected stay interval lasts at least as long as a certain period which defines a minimum duration of a break it will be taken into account for balancing the planned stay periods with the actual breaks. Otherwise, the system recognizes that the delay caused by the stop of the vehicle has simply to be added to the expected arrival time.

In one embodiment, the cluster location may be stored together with the aggregated stay interval. A route planning system can then compare the cluster location with one or more planned stay locations on a planned route and associate the cluster location representing the location of the detected stay with a corresponding planned stay location of the planned route. In an alternative embodiment, the actual stay location of the vehicle may be determined by evaluating all location data which are associated with segments of the active segments cluster. The actual stay location can then be determined, for example, by computing an average location from the respective location data. Thereby, border points in the location data associated with the active segment cluster may be disregarded for the computation of the average location because they are typically associated with higher uncertainty than intermediate points (where it is safe to assume that the vehicle was actually at standstill).

In one embodiment, a computer program product includes instructions that are loaded into a memory of a computing device and executed by at least one processor of the computing device to cause the processor to perform the herein disclosed method steps.

In one embodiment, a computer system has modules adapted to execute the herein disclosed computer-implemented stay detection method to perform the herein disclosed method steps.

Further aspects will be realized and attained by means of the elements and combinations particularly depicted in the appended claims. It is to be understood that both the foregoing general description and the following detailed description are exemplary and explanatory only and are not restrictive.

DETAILED DESCRIPTION

Figure 1:
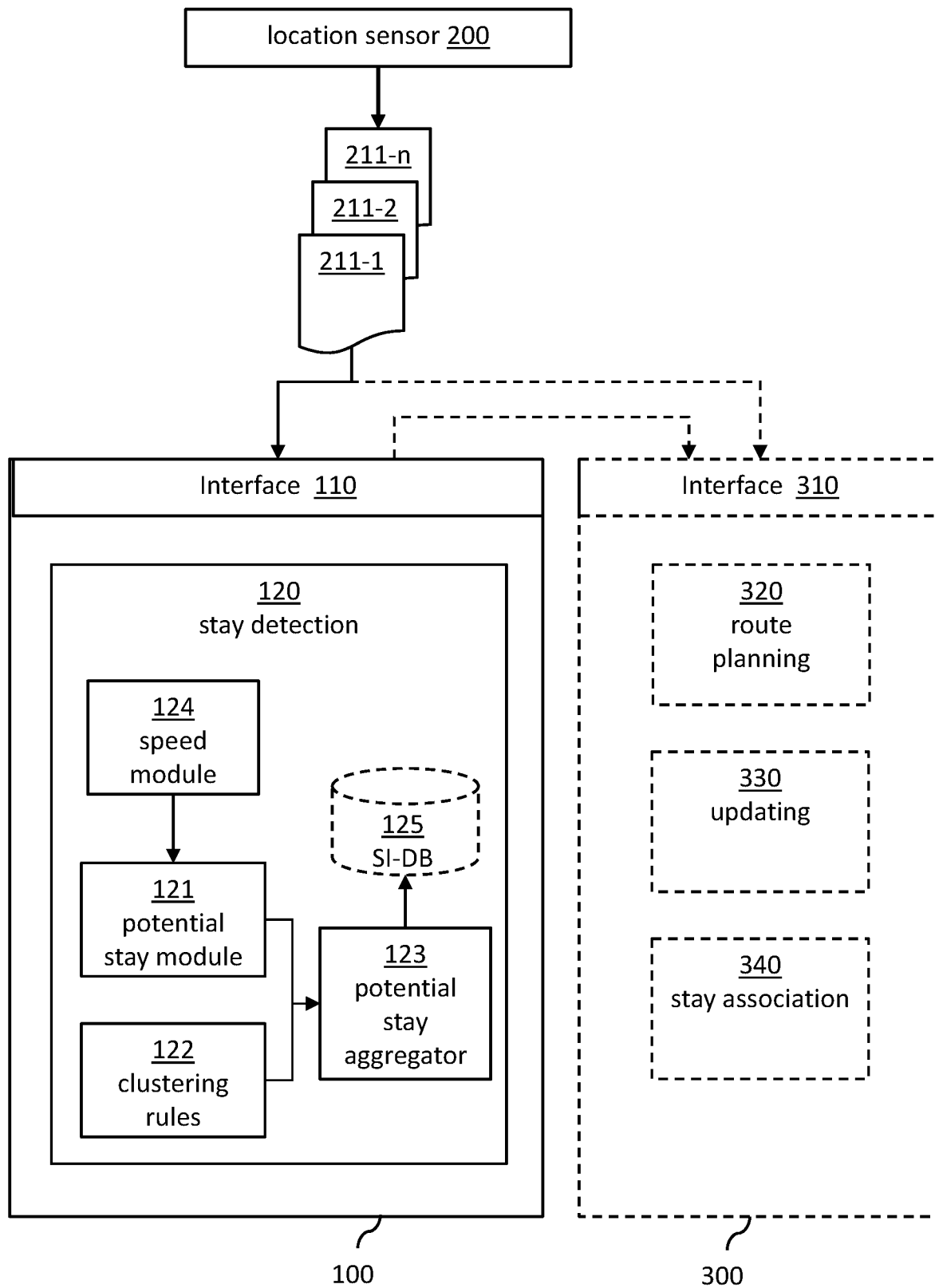
FIG. 1 is a simplified block diagram of a stay detection computer system according to an embodiment, wherein the system is communicatively coupled with a navigation system and one or more location sensors.
Figure 2A:
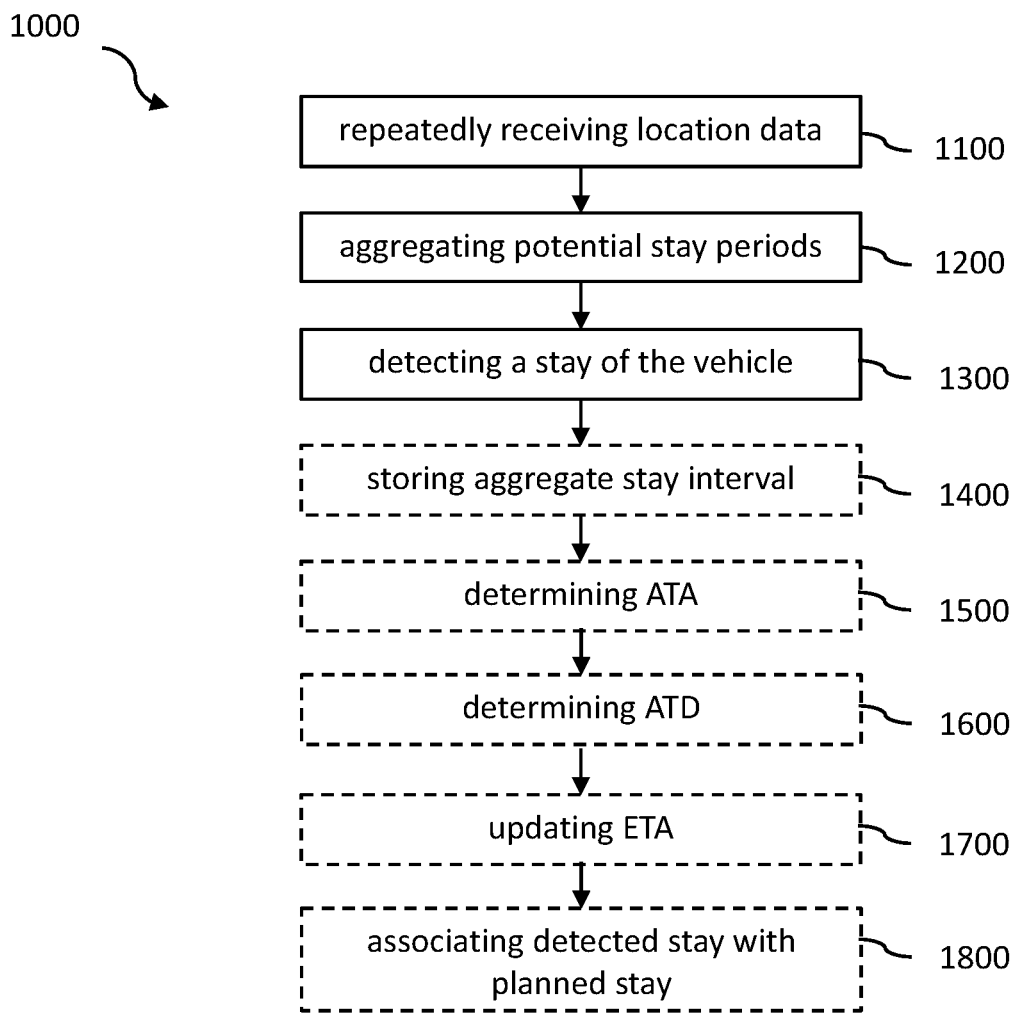
FIG. 2A is a simplified flow chart of a computer-implemented method for detecting the stay of a vehicle according to an embodiment.

FIG. 1 illustrates a simplified block diagram of a stay detection computer system 100 according to one example embodiment. System 100 is communicatively coupled with one or more location sensors 200. FIG. 1 is described in the context of FIG. 2A which is a simplified flow chart of a computer-implemented method 1000 for detecting the stay of a vehicle being executed by the system 100 in operation. The reference figures relate to both FIG. 1 and FIG. 2A. Some example elements of the embodiments are illustrated by dashed lines in the figures.

Figure 3:
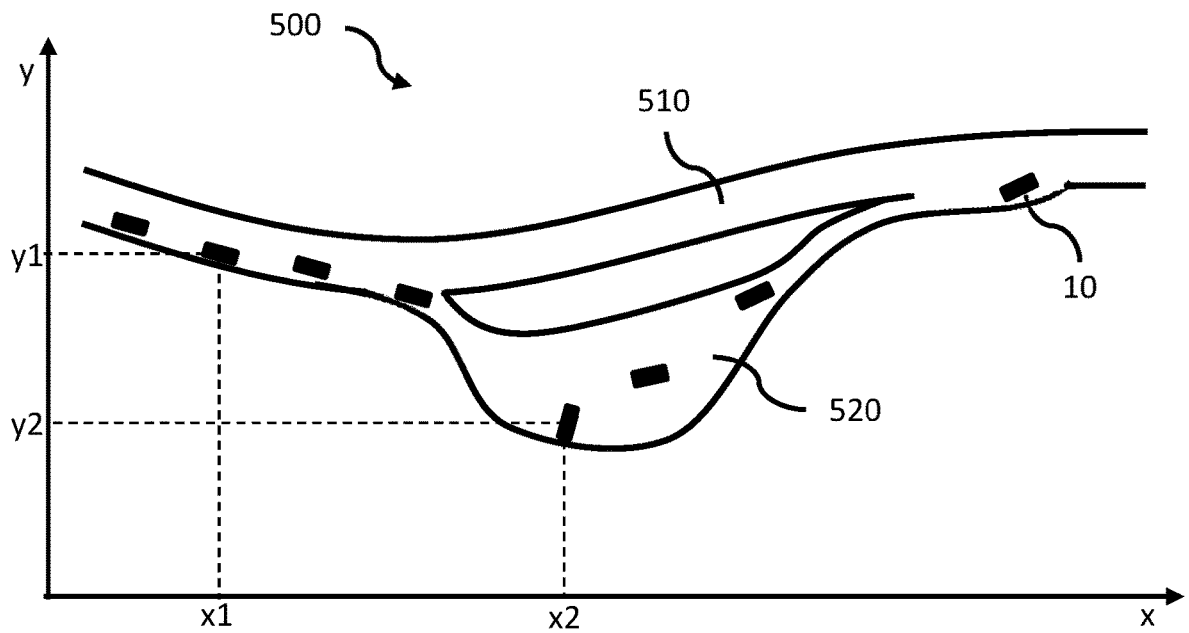
FIG. 3 is a terrain diagram illustrating the route of a vehicle with two stop locations.

The herein disclosed approach is applicable to real-world scenarios such as for example the scenario illustrated by the terrain diagram 500 in FIG. 3. FIG. 3 illustrates the route of a vehicle 10 with two stop locations (x1, y1), (x2, y2). In the example, the terrain diagram 500 is simplified in that it only uses a two-dimensional visualization of the terrain along the dimensions x and y represented by the x-axis and y-axis defining a coordinate system. Each point in the terrain diagram corresponds to a physical real-world location. The terrain 500 includes a section of a route 510 and a parking space (parking site) 520 which can be reached from the route.

For example, the vehicle 10 (illustrated by black rectangles) is driving on the route 510 from the left to the right. Each individual black rectangle in FIG. 3 corresponds to a position of the vehicle over time where location data is received. At the physical location (x1, y1) the vehicle comes to a short standstill because of high traffic density and continues again shortly after. Within this example, such a traffic caused intermediate stop should not be detected as a stay of the vehicle. The vehicle 10 then takes the exit to the parking space 520 and arrives at a second stop location (x2, y2) for making a longer break. The herein described stay detection system is able to distinguish traffic caused intermediate stops (x1, y1) from a real stay of the vehicle (x2, y2). When the driver finishes the break and departs from the stay location (x2, y2), the stay detection system recognizes the departure and can compute the total stay time of the vehicle. Finally, the vehicle enters the road 510 again.

Turning back to FIG. 1, the one or more location sensors 200 can be based on any technology which is capable to determine geo-coordinates of the respective sensor. Examples of location sensor types include but are not limited to: GNSS (global navigation satellite system) sensor such as a GPS (global positioning system) sensor, GBAS (ground-based augmentation system) or LAAS (local-area augmentation system) sensor. The one or more location sensors 200 are spatially associated with the vehicle such that the determined location data correspond to the location data of the vehicle. The location sensor periodically provides location data sets 211-1 to 211-$n$ to the stay detection computer system 100 through the interface 110. In vehicles often a CAN-Bus is used for the internal communication between hard-/ and software components of the vehicle. A typical time interval between two sensor data sets (e.g., 211-1, 211-2) received 1100 by the interface 110 is in the range of one second to 10 minutes. However, larger or smaller sampling rates for the location data may be used.

It is to be noted that typically the time intervals between pairs of consecutive location data sets may vary in length (duration). The stop location which is determined based on the received location sensor data may deviate from the actual physical stop location of the vehicle because of a noisy or otherwise imprecise positioning signal. Thereby, various positioning signal types are associated with different levels of signal accuracy regarding the position data. For example, positioning using a GPS signal is more accurate than positioning using a cell tower signal but measuring the location takes more time, consumes more energy and only works outdoors. In case the vehicle is standing underneath a roof, the GPS signal may not be received at all. The cell tower signal evaluation is faster but less accurate. Another option is using wireless local area network (WLAN, Wi-Fi) signals if there are multiple WLAN routers available so that triangulation methods can be applied. WLAN based positioning is faster and may be more accurate than GPS and may also be used indoors (e.g., under a roof). As a conclusion, on roads in most cases the system has to cope with cell tower triangulation (relatively fast but less accurate) and/or GPS (slower but more accurate). On parking sites, also WLAN may be available as a fast and accurate alternative.

Figure 4:
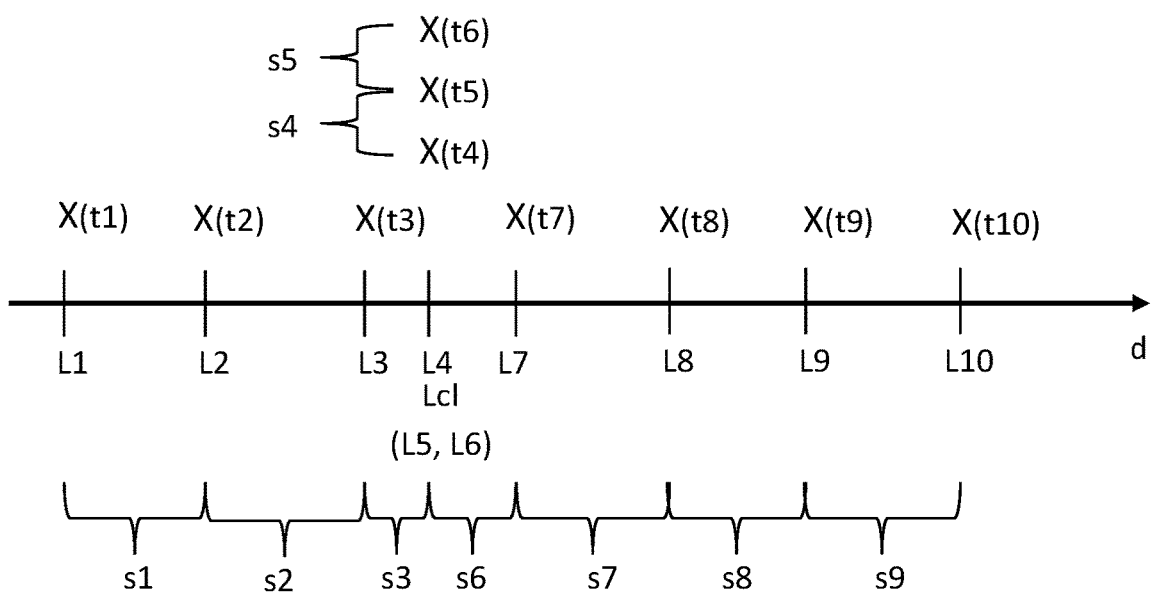
FIG. 4 illustrates an example with location data defining segments of a vehicle trajectory.

The system 100 repeatedly receives 1100 such location data 211-1 to 211-$n$ with associated timestamps from the one or more location sensors 200 attached to the vehicle via interface 110. Each pair of consecutive location data defines a segment of the vehicle's trajectory. Turning briefly to FIG. 4, a simplified one-dimensional view of the vehicle's trajectory illustrates a distance d covered by the vehicle in each segment s1 to s9. The received location data X(t1) to X(t10) include the current geo-coordinates of the vehicle and the corresponding timestamp. For example, location data X(t1) includes the geo-coordinates L1 and the timestamp t1. X(t4) to X(t6) with the timestamps t4 to t6 include geo-coordinates L4, L5, L6 with L5 and L6 in close vicinity to L4 indicating that the vehicle has stopped at location L4. As a simplification, L4 to L6 are visualized by the same dash on the distance axis d.

In the example, the pairs of consecutive location data <X(t1), X(t2)>, <X(t2), X(t3)>, . . . , <X(t9), X(t10)> define the corresponding segments s1 to s9 of the vehicle's trajectory. Each segment s* is associated with a time interval defined as the difference between the timestamps of the corresponding pair of consecutive location data representing end location and start location of the respective segment. Thereby, the end location of the segment is represented by the location data with the later timestamp, and the start location is represented by the location data with the earlier timestamp. For example, segment s1 defined by the location data pair <X(t1), X(t2)> is associated with the time interval t2−t1 and has the start location L1 and the end location L2. The differing distances between the start and end locations covered by the respective segments in the example can have different reasons: the associated time intervals can differ (as already explained above), the speed of the vehicle may vary, and/or the vehicle may have stopped in some of the segments (e.g., caused by a dense traffic situation, a red traffic light, etc., but also as part of a stay which is to be detected).

Turning back to FIG. 1, system 100 has a stay detection module 120 which includes submodules 121, 122, 123, 124 which are adapted to detect a stay of the vehicle based on the received location data 211-1 to 211-n.

A potential stay aggregator module 123 is adapted to aggregate 1200 potential stay periods of consecutive segments into an aggregated stay interval as long as a predefined segment clustering rule is fulfilled by the consecutive segments. A clustering rules module 122 is adapted to check if a current segment complies with the predefined segment clustering rule. A potential stay module 121 is adapted to determine a potential stay period for each segment. A potential stay period for a respective segment is detected if the time interval associated with the respective segment is longer than an expected driving time needed for driving a distance associated with the respective segment at a predefined expected speed. The predefined expected speed for a segment is provided by a speed module 124 of the stay detection module 120. The potential stay period is then computed for the respective segment as the difference between the associated time interval and the expected driving time.

Figure 5:
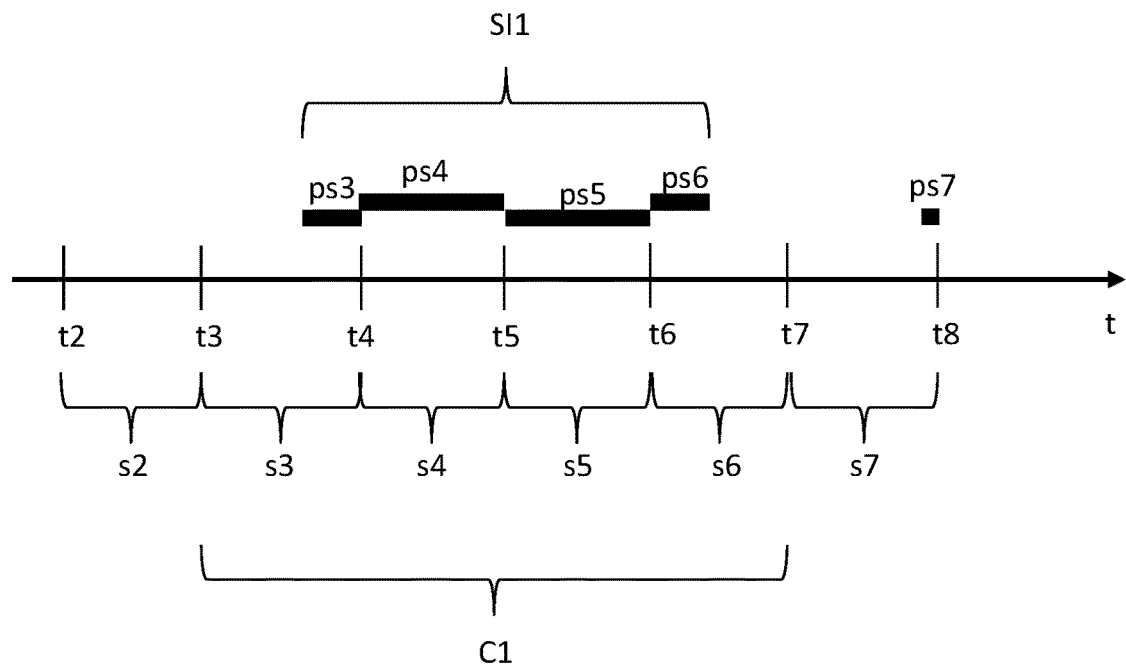
FIG. 5 illustrates an example of potential stay periods of segments belonging to a segment cluster.

Turning briefly to FIG. 5, the figure illustrates a time view in relation to the segments s2 to s7 of the trajectory example of FIG. 4. The timestamps t2 to t8 of the respective location data are shown on time axis t. The time intervals associated with the segments s2 to s7 are not necessarily of the same length. As explained earlier, they may differ (as in the example) because of reasons explained above. When looking at the segments s3 to s7 in FIG. 4, the distances covered by the segments s3 and s6 are significantly smaller than the distances covered by the segments s1, s2, s7 to s9, and the distances covered by the segments s4, s5 are substantially zero. This indicates that the vehicle stopped at some point in time during segment s3 at the stay location L4, remained at the stay location L4 during the segments s4, s5 and departed again at some point in time during segment s6.

The potential stay module determines the associated potential stay periods ps3 to ps6 of the consecutive segments s3 to s6. The stay interval aggregator then aggregates the determined potential stay periods into an aggregated stay interval SI1 as long as the predefined segment clustering rule is fulfilled by the consecutive segments. As long as one of the below conditions i) to iii) of the predefined clustering rule is fulfilled, a current segment is added to the segment cluster C1. In the example, the segments s3 to s6 are all added to the segment cluster C1.

Based on one condition of the predefined clustering rule, the stay interval aggregator recognizes that segment s3 is the first segment which complies with a first condition of the clustering rule:

Condition i)

A potential stay period greater than zero is detected for the current segment when there is no active segment cluster. Under condition i), the segment cluster C1 is initialized and becomes the active segment cluster when the potential stay period ps3 of s3 is detected. Initializing the active segment cluster includes setting the end location L4 (cf. FIG. 4) of the current segment s3 as the active cluster location Lcl. In other words, setting the active cluster location flags the segment cluster as active.

Further segments are added to the active segment cluster if one of the following conditions of the clustering rule is fulfilled:

Condition ii)

Figure 6:
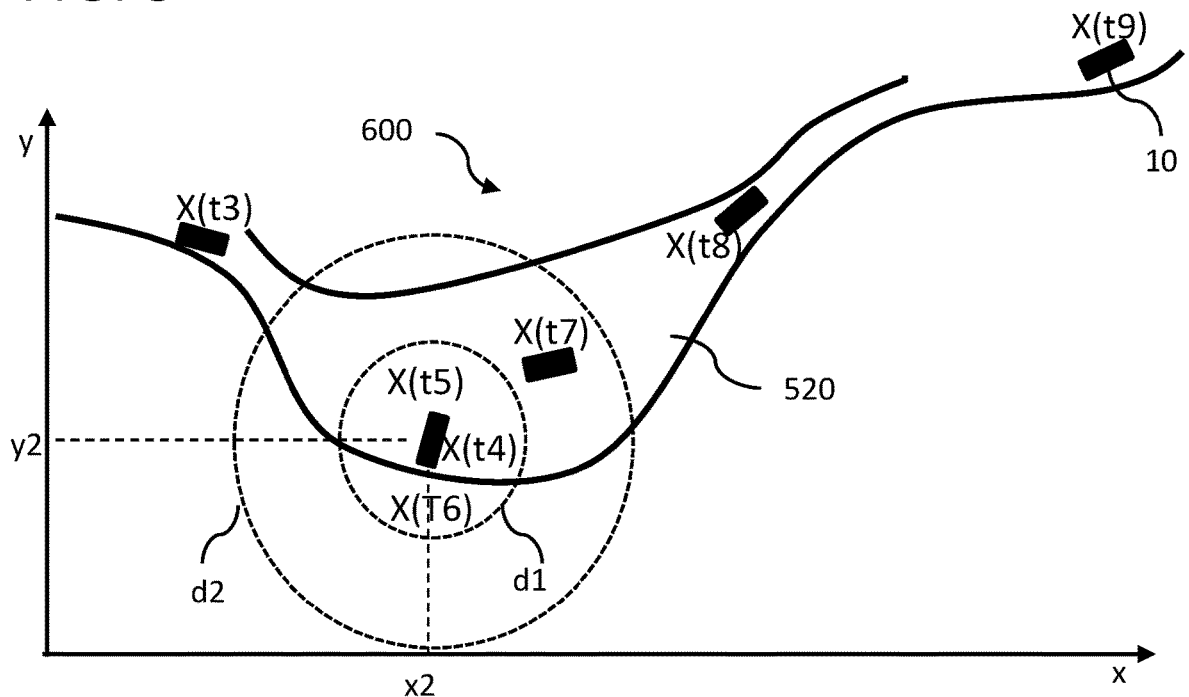
FIG. 6 is a terrain diagram illustrating an example with a first distance and a second distance used by a segment clustering rule.

The distance between the cluster location Lcl of the active segment cluster and the end location of the current segment is smaller than a predefined first distance d1. The first distance d1 is selected (chosen) to compensate for imprecision, noise or fluctuations of the received location data and the potential stay period for the current segment is the entire time interval associated with the current segment. This condition is illustrated in more detail in the terrain diagram 600 of FIG. 6 illustrating a scenario with noisy positioning signals. The terrain diagram 600 is a zoomed view of the terrain diagram of FIG. 3 where the parking space 520 with the second stop location (x2, y2)—the stay location L4 of the location data X(t4)—is in focus. At t4 (timestamp of the end location of s3) the segment cluster C1 is flagged active by setting L4 as the active cluster location and s3 is added to C1. The circle around L4 with a radius d1 defines a tolerance range chosen to compensate for the fluctuations of noisy location data. A typical radius for the tolerance range can be around 75 meters. For example, the parking space may be equipped with a plurality of WLAN routers providing a higher accuracy regarding the positioning signal. In this case, the tolerance range may be smaller. The location data sets X(t4), X(t5), X(t6) received during the stay of the vehicle may show considerable noise dependent on the type and quality of the positioning signal. In case of a low-quality signal (e.g., cell tower signals) typically location data sets received after t4 but during the vehicle's stay (at t5, t6) may deviate from the active cluster location set at t4. However, as long as the respective geo-coordinates are within the tolerance range d1, the respective segments are considered to be associated with the active cluster location and will be added to the segment cluster C1. Dependent on the noise level of the location sensor signal d1 may be chosen between 20 m and 100 m. A typical radius for a tolerance range can be around 75 m. For example, the parking space may be equipped with a plurality of WLAN routers providing a higher accuracy regarding the positioning signal. In this case, the tolerance range may be even smaller. The tolerance range d1 acts as a filter which ignores small deviations from the active cluster location as being caused by noise rather than by a vehicle movement. For such segments s4, s5 the entire time intervals t5−t4, t6−t5 of the segments are added as potential stay periods ps4, ps5 to the aggregated stay interval SI1.

Condition iii)

A current segment with a potential stay period greater than zero is always added to the active segment cluster. The final segment to be added to the active segment cluster is recognized if the distance between the active cluster location Lcl and the end location Te* of the current segment s* exceeds a predefined second distance d2, with the second distance being greater than or equal to the first distance d1. That is, if the vehicle moves a longer distance than the second distance d2 during the time interval associated with the current segment after departure from its stay location (as represented by the active cluster location), this is considered as an indicator that the vehicle has finally left its stay location. In this case, the subsequent segment must not be added to the active cluster anymore.

Dependent on the noise level of the location sensor signal and dependent on the length of the time interval associated with a segment, d1 may be chosen in the order of 20 m to 100 m. In the example, at t7, the vehicle 10 has already departed from its stay location. The system recognizes that the distance between L7 and L4 (cf. FIG. 4) is already greater than the radius d1. Therefore, s6 is no longer added to C1 under condition ii). Nevertheless, the vehicle was still in stay mode during a portion of s6. This portion needs to be added to the aggregated stay interval SI1 to allow for a more accurate computation of the entire stay period of the vehicle. Condition iii) allows to add s6 to the active cluster because a potential stay period ps6 greater than zero is determined for s6, and the distance between the active cluster location and the end location of s6 is between d1 and d2. At the same time, the system recognizes that s6 is the last segment for this active segment cluster and deactivates the so far active segment cluster. Dependent on the use case, d2 may be selected from the range of 300 m to 2 km. For example, a vehicle in stop-and-go traffic which only achieves an average speed of 5 km/h causes potential stay periods which should however not be taken into account for segment aggregation. An individually adjusted d2 value allows to classify each segment during the stop-and-go situation as a last segment with the consequence that the subsequent segment is not added. In such a case, the resulting cluster will generally comprise only a single segment, and the associated stay period will be less than the predefined minimum stay duration discussed further below, such that the cluster is discarded.

In the example of FIGS. 4 to 6, at t8, the vehicle 10 has reached L8. For the corresponding segment s7 a potential stay period ps7 greater than zero is computed. However, the segment cluster C1 is not active anymore. This leads to a situation where the segment cluster is initialized again with the active cluster location being set to L8. Segment s7 would then be added to the now active segment cluster as the first segment of the reinitialized cluster.

Some location sensors can provide the information about the source of the location data to the stay detection system. That is, the stay detection system knows from which kind of positioning signal the received location data sets originate. In such an embodiment, the stay detection system can dynamically adjust the size of the first distance d1 and the second distance d2 dependent on the positioning signal type. For example, if WLAN signals were used by the location sensor d1/d2 can be smaller than in the case of GPS signals because the location data based on WLAN signals are more precise (less noisy) than location data based on GPS signals. If cell tower signals are used by the sensor, the selected d1/d2 values advantageously are larger than in the case of GPS signals. Alternatively, the location sensor may be able to provide an accuracy/precision estimate on which the choice of d1 may be based.

The stay detection module 120 (cf. FIG. 1) finally detects 1300 a stay of the vehicle once the active segment cluster C1 is completed and the aggregated stay interval SI1 exceeds a predefined minimum stay period. The predefined minimum stay period is chosen such that a vehicle stay can be clearly distinguished from traffic related stops of the vehicle. The minimum stay period can be customized dependent on the use case and may vary between from some minutes to several hours. For example, a stay associated with a quick delivery of a parcel is likely in the order of 2-3 minutes whereas a stay associated with the fulfilment of a service order may be in the order of several hours. Dependent on which kinds of stays are to be detected, the minimum stay period can be adjusted accordingly. In case a stay of the vehicle is detected the aggregated stay interval SI and the corresponding stay location may be stored 1400 in a memory component 125. For example, memory component 125 may be implemented as a stay interval database SI–DB of system 100, or it may be implemented by an appropriate data structure which is communicatively coupled with system 100.

Figure 7:
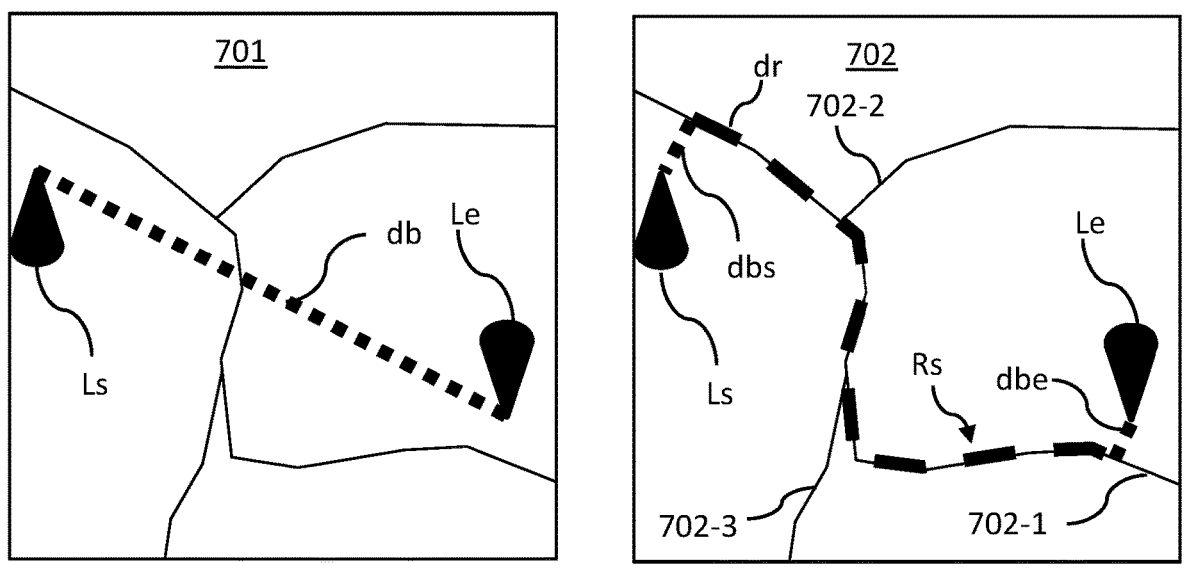
FIG. 7 illustrates two alternative implementations for determining a distance associated with a segment.

FIG. 7 illustrates two implementations of the potential stay module 121 for determining the distance associated with the respective segment which is then used to compute the expected driving time needed for driving that distance at a predefined expected speed.

In a first implementation 701 (left graph of FIG. 7), the distance associated with a respective segment is the bee-line distance db between start location Ls and end location Le of the respective segment. In this implementation, the distance to drive from Ls to Le via the real-world road network is ignored. Rather, only the straight connection between Ls and Le (dotted line db) is taken into account. In this implementation, the speed module provides a respective expected speed value which is typically based on averaged historic speed data for the segment. Such expected speed values are vehicle specific and may depend on the road type(s) underlying the respective segment. For example, a reasonable expected speed value for larger trucks on interurban roads is in the range between 40 km/h and 60 km/h whereas for normal cars values in the range between 60 km/ to 80 km/h have been proven as appropriate values. Such expected speed values can easily be calculated by dividing the bee-line distance by the historic driving times of respective vehicles to cover the distance associated with the segment. For urban roads the expected speed values for respective segments are typically lower than for interurban roads. Also, the speed module 124 may provide time dependent expected speed values which reflect the traffic situation on said segment during different times of the day or on different days of the week. When computing the potential stay period for the current segment on the vehicle's trajectory, the actual timestamps of the segment can serve as input to retrieve the appropriate time dependent expected speed value from the speed module.

In a second implementation 702 (right graph of FIG. 7), the distance associated with a respective segment is determined by mapping start location Ls and end location Le of the respective segment to a road network 702-1, 702-2, 702-3. The system then computes a route between the start and end locations with a corresponding routing distance dr using said road network. The route computation may be performed by a respective function of the speed module, or it may be implemented in a dedicated sub-module of the stay detection module. The potential stay module then uses said routing distance dr. When mapping the start and end locations of a segment to the road network it may occur that one or both locations cannot be mapped onto any of the roads of the road network but are mapped on a point of the map next to a road. This may occur either because of imprecise location data or because the vehicle is indeed off-road (e.g., on private premises or on a parking site which is not part of the road network in the corresponding map). In this case, standard routing functionality may be used to compute the routing distance by also taking into account the bee-line distance dbs, dbe between the start location LS and the nearest point on the particular road 702-1 and/or the end location Le and the nearest point on the particular road 702-1.

In this implementation the predefined expected speed for the respective segment is based on historic speed data for the respective segment (or a predefined speed associated with the respective segment type) taking into account a speed value associated with the computed route Rs (dashed route on road 702-1 and, in case the start location and/or end location cannot be mapped on a particular road, in addition the dotted bee-line portions dbs, dbe). The routing distance dr may cover multiple road portions which are annotated with different expected speed values. For example, if the segment covers multiple road portions with different speed limits, a part of the segment may cover one road portion with an historic speed value of 70 km/h and a further road portion with an historic speed value of 80 km/h. Again, these speed values can be vehicle specific, road type specific and time dependent. The speed module can then determine an average speed for the entire segment as expected speed value based on the respective historic speed data. In case the start location and/or end location cannot be mapped on a particular road, the speed module can also use a predefined off-road speed value for the bee-line distance parts dbs, dbe of the computed segment route Rs when computing the average expected speed value for said segment.

Figure 2B:
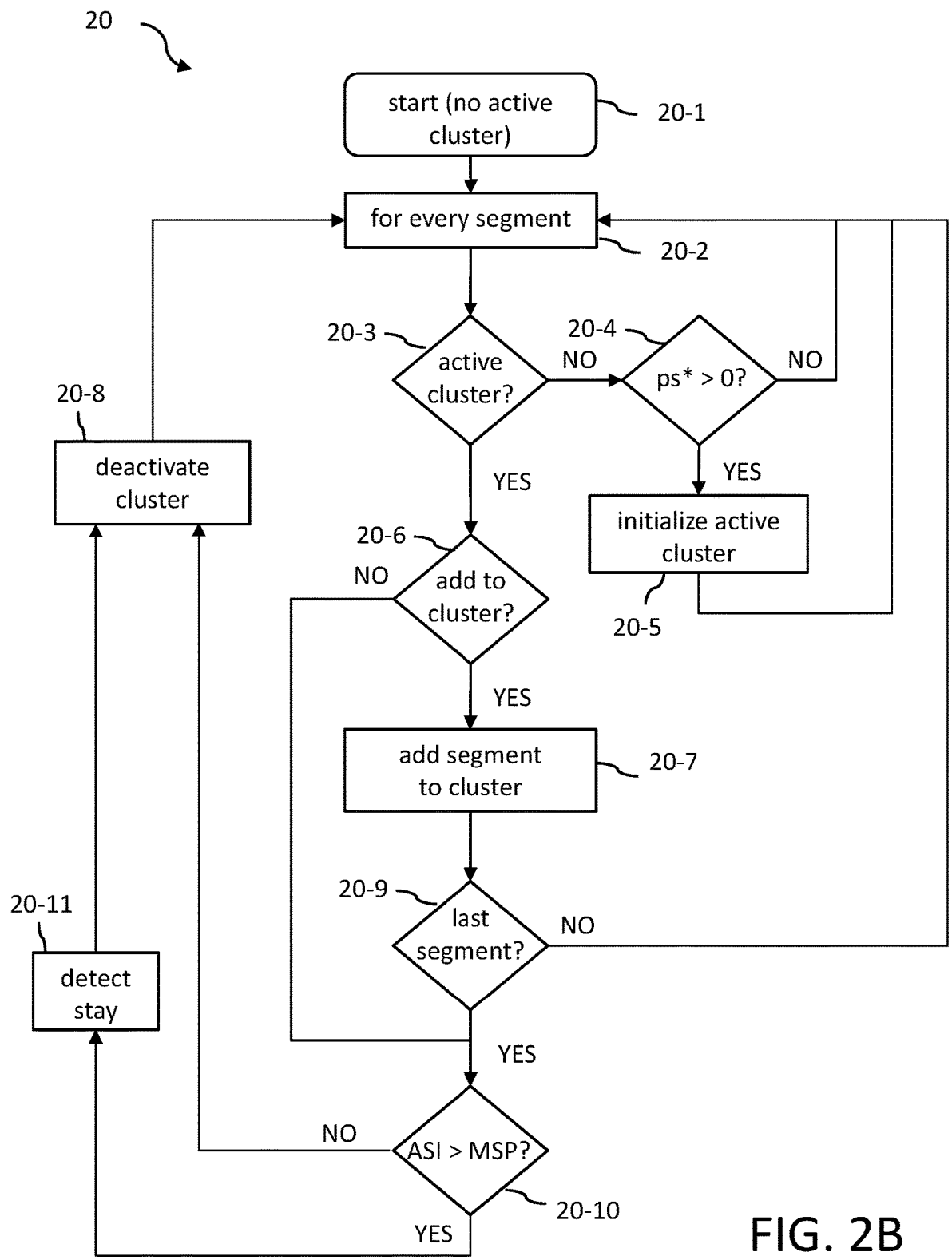
FIG. 2B is a flow chart illustrating details of a particular implementation of said computer-implemented method for detecting the stay of a vehicle.

FIG. 2B is a flowchart 20 illustrating the segment clustering process in more detail. The process starts 20-1 with no segment cluster being active. A loop control element 20-2 ensures that for every segment the following steps are performed. For the current segment (i.e., the segment currently being processed by the loop), a check 20-3 is performed if there is an active segment cluster. If "NO", a further check 20-4 is performed to check if the current segment fulfills the condition of a first segment by checking if the current segment is associated with a potential stay period ps* greater that zero. If no, the process continues with the next segment. If "YES", the segment cluster is initialized 20-5 by setting the end location of the current segment as the active cluster location. Then, the process continues with the next segment.

If the active cluster check 20-3 returns "YES", the predefined clustering rule checks 20-6 whether the current segment is to be added to the active segment cluster, and if "YES", adding 20-7 the current segment to the active segment cluster either as an "inner segment" if condition ii) is fulfilled, or as the last segment of the cluster if condition iii) is fulfilled. If the current segment does not comply with one of the conditions of the clustering rule ("NO" for check 20-6) no further segment is added to the active segment cluster. In this case, the stay detection module checks 20-10 if the aggregated stay interval ASI is greater than a predefined minimum stay period MSP to determine if the clustered segments indicate a stay.

If the added segment is not identified as the last segment of the active segment cluster, i.e., fulfilling condition ii) rather than condition iii), the process continues with the next segment. If the added segment is identified as the last segment ("YES" for check 20-9, i.e., condition iii) is fulfilled) the stay detection module checks 20-10 if the aggregated stay interval ASI is greater than a predefined minimum stay period MSP. If "YES", a stay of the vehicle is detected 20-11, the active cluster is deactivated 20-8, and the process continues with the next segment. If "NO" (e.g., an accidental stop of the vehicle caused by the traffic situation which does not qualify as a stay), the active cluster is also deactivated and the process continues with the next segment.

In some embodiments, the stay detection module may also determine the actual time of arrival (ATA) of the vehicle at the stay location and/or its actual time of departure (ATD) from the stay location. For determining 1500 ATA (cf. FIG. 2A), the stay detection module computes ATA as the timestamp associated with the cluster location minus the potential stay period of the first clustered segment. As a potential stay period is an estimate of the time a vehicle is standing still in a respective segment, of course the determined ATA is also an estimate of the actual arrival time. In the example of FIG. 4, ATA=t4−ps3. For determining 1600 ATD, the stay detection module computes ATD as the timestamp of the start location of the last clustered segment plus the potential stay period of the last clustered segment. In the example of FIG. 4, ATD=t6+ps6. As mentioned earlier, potential stay periods are treated by the system as actual stay periods once the system detects a stay of the vehicle.

In an embodiment illustrated in FIG. 1, the interface 110 of the stay detection system 100 may be coupled with an appropriate interface 310 of a navigation system 300, wherein coupling of the navigation system 300 with the stay detection system 100 also includes embodiments where system 100 is implemented as an integrated component of the navigation system. The navigation system 300 has a route planning component 320 configured to compute an expected arrival time of the vehicle based on a planned route, a start time and at least one planned stay period. Route planning algorithms are known by the person skilled in the art of navigation systems. Based on start and end point of the planned tour the system computes one or more alternative routes according to pre-defined constraints (e.g., shortest route, fastest route, economical route, etc.). The system uses information stored in maps about distance and average speed on certain parts of the route to compute the expected arrival time. The route planning component 320 further allows planning stay periods for a planned route which are then used as input data when computing the expected arrival time. In a second mode, the route planning component can take into account actual measured stay periods when updating a planned route based on actual location and time data. Both modes can be run simultaneously.

In operation, the navigation system 300 periodically receives the current location data from the one or more location sensors 200 of the vehicle and can update the expected arrival time by taking into account the current time, the current location of the vehicle and the remaining planned route. However, for a correct update of the expected arrival time it is advantageous for the navigation system to distinguish between actual stays of the vehicle which correspond to planned stay periods versus stops which may be caused by a traffic jam, red traffic lights or similar incidents. For this purpose, the navigation system 300 can receive the measured aggregated stay interval from the computer system 100 through the interface component 310 (e.g., via the internal communication bus of the vehicle). The updating component 330 of the navigation system can then update 1700 the expected arrival time ETA based on the current location of the vehicle, the current time, and the received aggregated stay interval. Thereby, updating 1700 includes charging the aggregated stay interval up against the at least one planned stay period if the length of the aggregated stay interval exceeds the predefined minimum stay period. In other words, the updating component 330 knows the minimum time interval required for a stay period which qualifies as a break of the driver according to the planned stay periods. Only if the measured aggregated stay period is at least as long as the minimum time interval for a break it will be taken into account as a planned stay period (break) and the at least one planned stay period is reduced by the actual measured stay period (aggregated stay interval). In this case, there is no effect on the expected arrival time unless the remainder of the at least one planned stay period is less than the minimum stay period. In this case, the difference between the minimum stay period and the remainder is added to the expected arrival time because an actual pause will always have at least the length of the minimum stay period. However, if the actual measured aggregated stay interval is larger than the remaining at least one planned stay period the difference amount is added to the expected arrival time. A measured aggregated stay interval which is shorter than the minimum stay period for a break directly affects the computation of the expected arrival time as it is automatically added to the expected arrival time by not being compensated through the planned stay period(s).

It is to be noted that for the updating step it is not necessary that the active segment cluster is already completed. At the moment the aggregated stay interval for an active segment exceeds the predefined minimum stay period the navigation system can take the current aggregated stay interval for the active cluster into account when updating ETA even when the stay is still in progress because at that moment it is clear that a stay has been detected. That is, each time a segment has been added to the active segment cluster a meaningful ETA update can be computed.

In a further embodiment, a stay association module 340 of the navigation system can compare the cluster location with one or more planned stay locations on a planned route in a route planning system, and may associate 1800 the cluster location representing the location of the detected stay and the corresponding stay interval with a corresponding planned stay location of the planned route. In typical applications of this embodiment, the planned stay locations will correspond to sites where goods are to be delivered and/or picked up by the vehicle, or services are to be performed by the driver. Once the detected stays have been associated with the planned stay locations, subsequent analyses may be carried out. For example, the time actually spent at each planned location may be taken into account to improve the calculation of future routes involving planned stays at the same locations with a more accurate estimate of the delivery/pickup/service time, that is, using actual stay times to predict future stay times. As another example, the locations used in the route planning may not correctly reflect the actual locations where goods are to be delivered/picked up or services are to be performed. In such a case, the detected stay locations may be used to correct the respective locations for use in the planning of future routes.

Figure 8:
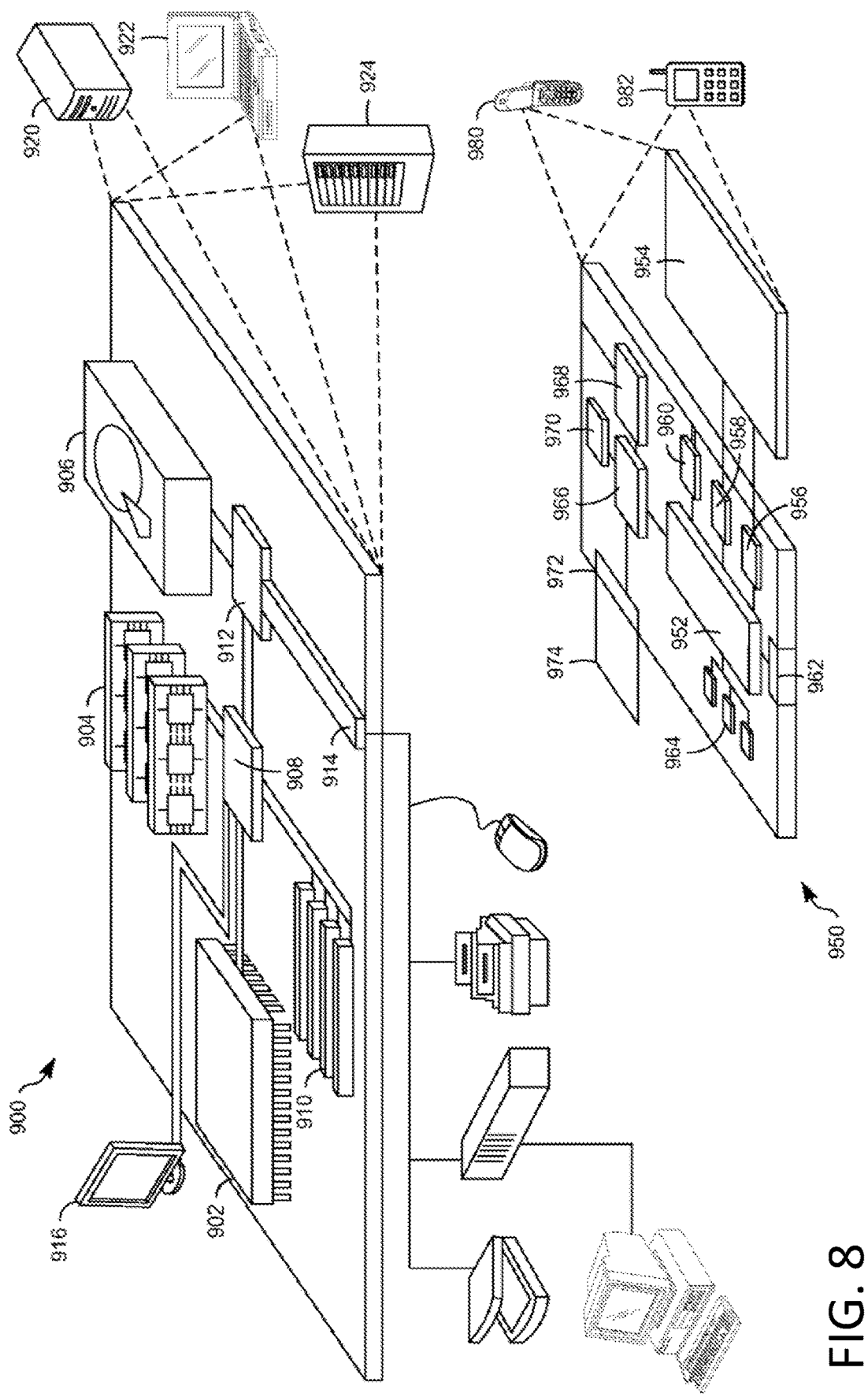
FIG. 8 is a diagram that shows an example of a generic computer device and a generic mobile computer device, which may be used with the techniques described herein.

FIG. 8 is a diagram that shows an example of a generic computer device 900 and a generic mobile computing device 950, which may be used with the techniques described here. Computer device 900 is intended to represent various forms of digital computers, such as laptops, desktops, workstations, personal digital assistants, servers, blade servers, mainframes, and other appropriate computers. Generic computer device 900 may correspond to the computer system 100 for stay detection of FIG. 1. Computing device 950 is intended to represent various forms of mobile devices, such as personal digital assistants, cellular telephones, smart phones, and other similar computing devices. For example, computing device 950 may include the navigation system 300 as shown in FIG. 1. The components shown here, their connections and relationships, and their functions, are meant to be exemplary only, and are not meant to limit implementations described and/or claimed in this document.

Computer device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller with high-speed interface 908 manages bandwidth-intensive operations for the computing device 900, while the low-speed controller with low-speed interface 912 manages lower bandwidth-intensive operations. Such allocation of functions is exemplary only. In one implementation, the high-speed controller is coupled to memory 904, display 916 (e.g., through a graphics processor or accelerator), and to high-speed expansion ports 910, which may accept various expansion cards (not shown). In the implementation, low-speed controller is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as computing device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory may also be provided and connected to device 950 through an expansion interface, which may include, for example, a SIMM (Single In Line Memory Module) card interface. Such expansion memory may provide extra storage space for device 950, or may also store applications or other information for device 950. Specifically, expansion memory may include instructions to carry out or supplement the processes described above, and may include secure information also. Thus, for example, expansion memory may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984 or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for detecting a stay of a vehicle, comprising:
repeatedly receiving location data with associated timestamps from one or more location sensors associated with the vehicle, wherein each pair of consecutive location data defines a segment of a trajectory of the vehicle, thereby each segment being associated with a time interval defined as a difference between timestamps of a corresponding pair of consecutive location data representing end location and start location of a corresponding segment;
aggregating potential stay periods of consecutive segments into an aggregated stay interval as long as a predefined segment clustering rule is fulfilled by the consecutive segments, wherein a potential stay of the vehicle with a potential stay period for a respective segment is detected if the time interval associated with the respective segment is longer than an expected driving time needed for driving a distance associated with the respective segment at a predefined expected speed, and the potential stay period being computed for the respective segment as the difference between a respective time interval and the expected driving time; and
detecting the stay of the vehicle if the aggregated stay interval exceeds a predefined minimum stay period.

2. The method of claim 1, wherein the predefined segment clustering rule is fulfilled by a current segment and the current segment is appended to an active segment cluster in case:
the current segment is a first segment for which a first potential stay with a first potential stay period greater than zero is detected, in which case the active segment cluster is initialized by setting as active cluster location the end location of the current segment;
OR
the distance between a cluster location of the active segment cluster and the end location of the current segment is smaller than a first distance, wherein the first distance is selected to compensate for imprecision of received location data, and the potential stay period for the current segment is an entire time interval associated with the current segment;
OR
the potential stay period of the current segment is greater than zero, wherein the current segment is detected as a last segment to be added to the active segment cluster if the distance between the active cluster location and the end location of the current segment exceeds a second distance, with the second distance being greater than or equal to the first distance.

3. The method of claim 2, further comprising:
determining an actual time of arrival for the stay of the vehicle as the difference between a timestamp associated with the cluster location and the potential stay period of the first segment.

4. The method of claim 2, further comprising:
determining an actual time of departure as a sum of a timestamp of the start location of the last segment and the potential stay period of the last segment.

5. The method of claim 2, further comprising:
comparing the active cluster location with one or more planned stay locations on a planned route in a route planning system, and associating the active cluster location representing a location of the stay with a corresponding planned stay location of the planned route.

6. The method of claim 2, wherein a size of the first distance is dynamically adjusted taking into account a quality of positioning signals received from the one or more location sensors.

7. The method of claim 1, further comprising:
storing the aggregated stay interval if the stay of the vehicle is detected.

8. The method of claim 1, wherein the distance associated with the respective segment is determined by:
using a bee-line distance between a respective start location and a respective end location of the respective segment; or
mapping the respective start location and the respective end location of the respective segment to a road network to determine a routing distance, and using the routing distance between the respective start location and the respective end location of the respective segment.

9. The method of claim 8, wherein the predefined expected speed for the respective segment when using the bee-line distance is a speed value based on historic speed data for the respective segment.

10. The method of claim 9, wherein the predefined expected speed for the respective segment has a time-dependency which reflects different traffic conditions and the speed value is selected based on one of the timestamps associated with the start location or the end location of the respective segment.

11. The method of claim 8, wherein the predefined expected speed for the respective segment when using the routing distance is based on historic speed data for the respective segment taking into account a speed value associated with a computed route, wherein, in case the start location and/or the end location cannot be mapped onto a particular road of the road network, a predefined off-road speed value is used for the bee-line distance between the start location and a nearest point on the particular road and/or the end location and the nearest point on the particular road.

12. The method of claim 1, further comprising:
updating an expected arrival time in a vehicle navigation system, wherein the expected arrival time is computed based on: a planned route, at least one planned stay period, a current location of the vehicle, a current time, and the aggregated stay interval, and wherein updating includes including the aggregated stay interval as part of the at least one planned stay period if a length of the aggregated stay interval exceeds the predefined minimum stay period.

13. The method of claim 1, wherein the one or more location sensors are selected from the group of: Global Positioning System (GPS) sensor, Global Navigation Satellite System (GNSS) sensor, Ground Based Augmentation System (GBAS) sensor, and a Local Area Augmentation System (LAAS) sensor.

14. A stay detection computer program product tangibly embodied on a non-transitory computer-readable storage medium and having instructions that when loaded into a memory of a computing device and executed by at least one processor of the computing device cause the computing device to:
repeatedly receive location data with timestamps from one or more location sensors associated with a vehicle, wherein each pair of consecutive location data defines a segment of a trajectory of the vehicle, thereby each segment being associated with a time interval defined as a difference between the timestamps of a corresponding pair of consecutive location data representing end location and start location of a corresponding segment;
aggregate potential stay periods of consecutive segments into an aggregated stay interval as long as a predefined segment clustering rule is fulfilled by the consecutive segments, wherein a potential stay of the vehicle with a potential stay period for a respective segment is detected if the time interval associated with the respective segment is longer than an expected driving time needed for driving a distance associated with the respective segment at a predefined expected speed, and the potential stay period being computed for the respective segment as the difference between a respective time interval and the expected driving time; and
detect a stay of the vehicle if the aggregated stay interval exceeds a predefined minimum stay period.

15. The stay detection computer program product of claim 14, wherein the predefined segment clustering rule is fulfilled by a current segment and the current segment is appended to an active segment cluster in case:
the current segment is a first segment for which a first potential stay with a first potential stay period greater than zero is detected, in which case the active segment cluster is initialized by setting as active cluster location the end location of the current segment;
OR
the distance between a cluster location of the active segment cluster and the end location of the current segment is smaller than a first distance, wherein the first distance is selected to compensate for imprecision of received location data, and the potential stay period for the current segment is an entire time interval associated with the current segment;
OR
the potential stay period of the current segment is greater than zero, wherein the current segment is detected as a last segment to be added to the active segment cluster if the distance between the active cluster location and the end location of the current segment exceeds a second distance, with the second distance being greater than or equal to the first distance.

16. The stay detection computer program product of claim 14, wherein the distance associated with the respective segment is determined by:
using a bee-line distance between a respective start location and a respective end location of the respective segment; or
mapping the respective start location and the respective end location of the respective segment to a road network to determine a routing distance, and using the routing distance between the respective start location and the respective end location of the respective segment.

17. The stay detection computer program product of claim 14, wherein the instructions, when loaded into the memory of the computing device and executed by the at least one processor of the computing device cause the computing device to:
update an expected arrival time in a vehicle navigation system, wherein the expected arrival time is computed based on: a planned route, at least one planned stay period, a current location of the vehicle, a current time, and the aggregated stay interval, and wherein updating includes including the aggregated stay interval as part of the at least one planned stay period if a length of the aggregated stay interval exceeds the predefined minimum stay period.

18. A computer system for detecting a stay of a vehicle, comprising a memory and one or more processors, the memory storing modules being adapted to be executed by the one or more processors to:
repeatedly receive location data with associated timestamps from one or more location sensors associated with the vehicle, wherein each pair of consecutive location data defines a segment of a trajectory of the vehicle, thereby each segment being associated with a time interval defined as a difference between timestamps of a corresponding pair of consecutive location data representing end location and start location of a corresponding segment;
aggregate potential stay periods of consecutive segments into an aggregated stay interval as long as a predefined segment clustering rule is fulfilled by the consecutive segments, wherein a potential stay of the vehicle with a potential stay period for a respective segment is detected if the time interval associated with the respective segment is longer than an expected driving time needed for driving a distance associated with the respective segment at a predefined expected speed, and the potential stay period being computed for the respective segment as the difference between a respective time interval and the expected driving time; and
detect the stay of the vehicle if the aggregated stay interval exceeds a predefined minimum stay period.

19. The computer system of claim 18, wherein the predefined segment clustering rule is fulfilled by a current segment and the current segment is appended to an active segment cluster in case:

the current segment is a first segment for which a first potential stay with a first potential stay period greater than zero is detected, in which case the active segment cluster is initialized by setting as active cluster location the end location of the current segment;

OR the distance between a cluster location of the active segment cluster and the end location of the current segment is smaller than a first distance, wherein the first distance is selected to compensate for imprecision of received location data, and the potential stay period for the current segment is an entire time interval associated with the current segment;

OR the potential stay period of the current segment is greater than zero, wherein the current segment is detected as a last segment to be added to the active segment cluster if the distance between the active cluster location and the end location of the current segment exceeds a second distance, with the second distance being greater than or equal to the first distance.

20. The computer system of claim 18, wherein the distance associated with the respective segment is determined by:

using a bee-line distance between a respective start location and a respective end location of the respective segment; or mapping the respective start location and the respective end location of the respective segment to a road network to determine a routing distance, and using the routing distance between the respective start location and the respective end location of the respective segment.

* * * * *